United States Patent [19]

Ananth et al.

[11] Patent Number: 5,454,157
[45] Date of Patent: Oct. 3, 1995

[54] METHOD OF MANUFACTURING A HERMETICALLY SEALED DISK DRIVE

[75] Inventors: Raju S. Ananth, San Jose; Adolf L. Fick, Cupertino; Frank I. Morris, San Jose, all of Calif.

[73] Assignee: Maxtor Corporation, San Jose, Calif.

[21] Appl. No.: 179,518

[22] Filed: Jan. 10, 1994

Related U.S. Application Data

[62] Division of Ser. No. 961,094, Oct. 14, 1992.
[51] Int. Cl.[6] ........................................................ G11B 5/42
[52] U.S. Cl. .................... 29/603; 29/467; 29/469; 360/97.03
[58] Field of Search ............................ 360/97.01, 97.02, 360/97.03, 98.01, 105, 106; 29/603, 467, 469

[56] References Cited

U.S. PATENT DOCUMENTS 5,025,335  6/1991  Stefansky ..................... 360/97.01
5,293,282  3/1994  Squires et al. ................. 360/98.01

Primary Examiner—Carl E. Hall
Attorney, Agent, or Firm—Emery L. Tracy

[57] ABSTRACT

A disk drive having a hermetically sealed disk chamber capable of being filled with gas at pressures above ambient pressure with a specially designed connector assembly for use with the sealed chamber. Helium or nitrogen is injected into the sealed disk chamber. To decrease power consumption at high platter spin rates, the present invention advantageously utilizes a sealed disk chamber filled with helium to reduce tribological resistance forces associated with the surfaces of the spinning platters. Nitrogen is used to reduce oxidation of the disk platters. Special fixtures maintaining high position tolerance and connectors are designed to coupled the PC board controller of the disk drive unit to the components of the disk drive within the sealed disk chamber to eliminate connecting flexcircuits from the junction of the hermetically sealed chamber.

29 Claims, 9 Drawing Sheets

METHOD OF MANUFACTURING A HERMETICALLY SEALED DISK DRIVE

This is a divisional of application Ser. No. 07/961,094, filed Oct. 14, 1992.

BACKGROUND OF THE INVENTION

(1) Field of the Invention

The present invention relates to the field of disk drive storage units. Specifically the present invention relates to the technology of disk drive storage units and their manufacture.

(2) Prior Art

Disk drive storage mediums, or "hard" disk drives, are mechanisms that store digital information on a spinning disk or platter. The magnetic platters are approximately from 1.5 inches in diameter up to 8 inches or more depending on the type of disk drive used or the storage capacity of the drive. Several platters arranged in parallel, one mounted on top of the next, rest in a drive case. Each platter is centrally fixed and carefully aligned in order to provide the spinning action required. A platter has two sides in which information can be stored. Also mounted to the drive case is an actuator arm which holds a read/write head associated with each platter side. If there are eight platters there could be up to 16 heads attached to the actuator arm.

The actuator arm remains fixed with respect to the spinning platters but can move across the diameter of the spinning platter in order to provide access to all of the surface area of the platter as the platter spins and as the actuator arm moves the read/write head across the platter diameter. Since the head remains in a fixed path and the platters spin, data is stored according to the arc of the heads across the platters, this is a circle. Therefore, magnetic data stored on a hard drive platter is stored in circular paths or sectors by the magnetic head passing across the magnetic surface. The rate that this information can be accessed or stored at depends on the rate that the platters can spin. Conventional prior art disk drives can obtain a spin rate of approximately 3600 to 6400 revolutions per minute. The faster the spin rate, the faster information can be supplied by the drive and stored to the disk drive unit. Therefore, it is advantageous to increase the platter spin rate of the drive unit. The read/write heads associated with each platter fly above the platter surface on a cushion of air that is created by the air forces of the spinning platters. The heads ride very closely with the platter surface to they can read and write magnetic information onto the platter surface. The characteristics of the air dictate the size, shape and movement of the flying read/write heads.

The platters and actuator arm with associated heads are contained in a chamber within the disk drive unit. This chamber protects the platters and delicate movement required for the precise alignment of the platters to the actuator arm. Usually this chamber is sealed within a "clean room" having a reduced particle count so as to reduce the amount of dust and other particles that may become trapped within the drive case when the chamber is sealed. These particles could destroy the disk drive if they were to become entrenched into the platters and mechanisms.

In order to achieve the spin rates of conventional disk drives, energy must be supplied to a spindle motor which spins the platters which are coupled to a central spindle. Once the platters speed up to their desired rate, energy must be supplied in order to overcome what is called "viscous drag" forces that act upon the platters. As the platters spin, friction from the surrounding air within the drive chamber act as resistance forces upon the platters. These resistance forces are called "tribological" forces and are related to the surface rubbing of the surrounding air of the drive chamber and the spinning platters. At 3600 RPM, conventional disk drives require approximately 1 to 2 watts of power in order to maintain this rate and overcome the tribological forces acting upon the platters within the drive chamber.

A percentage of the power input to the disk drive platters is expended as heat throughout the surface of drive units. Therefore, as more power is required to maintain high spin rates, the drive unit begins to heat up and radiate a large amount of unwanted heat. Since hard disk drives are often situated in computer systems in close proximity with electrical boards, it is not desirable that disk drives radiate heat. Excessive radiated heat causes electric circuits, chips and components to malfunction. It would be advantageous to be able to reduce the amount of tribological forces upon disk drives in order to reduce the power required to maintain high platter spin rates. This would be advantageous because the heat radiated by disk drives could then be reduced. The present invention offers a solution to this problem by reducing the tribological forces on drive mechanisms.

Another reason to reduce the power consumption of disk drives is for power conservation. An increasing number of laptops and battery operated computers are becoming available and popular. These computers have only a limited amount of energy to power all of their components. The continuous spinning of the drive platters consumes a large percentage of the battery lifetime. If power consumption could be reduced at increased spin rates, then battery powered computer systems could operate at longer durations in between battery charges.

The present invention solves the above problems by providing an apparatus and method to increase the platter spin rate in disk drives while reducing the overall power consumption and heat radiation of the disk drive.

Also, the disk drive chambers of prior art disk drives are sealed with air located within the chamber. Since air contains a mixture of nitrogen and oxygen (among other elements), a large amount of oxygen is trapped within the drive chamber and exposed to the surfaces of the drive platters. Through a well known process, oxidation occurs on the metallic drive platters which can destroy the data bearing surfaces of the platters by marking the platters or "pitting" the platter surfaces which must remain smooth because the read/write heads fly so close to the platter surface. It would be advantageous to eliminate this oxidation problem to increase the life span of hard disk drives and decrease failure rates. The present invention also offers such a solution.

Within hard disk drives, information is transferred to and from the drive platters through the magnetic read/write heads by way of flexcircuits which couple to the drive heads. Special flexible flexcircuits also couple the actuator arm in order to control the movement of this arm and the associated magnetic read/write heads. These flexcircuits must be able to couple to the read/write heads, the actuator arm movement device, and to the platter spin motor which are all situated inside the sealed chamber. The other ends of these flexcircuits must be able to connect to the outside of the sealed chamber to a disk drive controller circuit on a PC board. A typical prior art disk drive 110 is shown in FIG. 1. A base 101 is shown which provides a mounting surface for the actuator arm and the platters and other drive mechanisms. Case 100 is placed over the base 101, the platters (not shown), and the actuator arm (not shown) in order to provide the sealed chamber. As can been seen, flexcircuits and connectors 103 and 102 are shown extending from the junction of the sealed chamber. The free ends of the connectors are exposed outside the sealed chamber and the other ends are coupled within the chamber to the actuator arm movement, the read/write heads, and the platter spin motor (actuator). The cables 102 and 103 are standard flexible connectors and will hook inside under base 101 in order to connect to receiving connectors of a PC board located and mounted under base 101 which acts as a hardware controller device.

It can be seen that the flexcircuits 102 and 103 are placed through the junction of the base 101 and the case 100. In order to maintain the sealed chamber with these flexcircuits present in this junction, the junction of the case 100 and the base 101 must be epoxy or glue sealed. The epoxy flows around the irregularly shaped cables to insure a proper chamber. However, once the base 101 and the case 100 are sealed by epoxy, glue, or cement, they are permanently affixed together. This makes repair of the components located within the chamber almost impossible since the chamber junction must be cut in order to access these components throwing dust and debris into the chamber. Also, these flexcircuits extend outward from the disk drive unit. They often tear and rip if caught during manufacturing on an assembly line; this sometimes destroys the entire drive unit. Because of the length of the flexcircuit they also produce unwanted stray capacitance in the disk drive system that increases as data access frequency increases. For these reasons, it would be advantageous to eliminate the flexcircuits from the junction of the base 101 and the case 100 to allow the case 100 and base 101 to be connected "flush." The present invention allows for such a function. The present invention provides a method and means where the disk drive case and base can be coupled together without a permanent sealer because the flexcircuits are not located within the base and case junction of the sealed chamber.

Therefore, it is an object of the present invention to provide a hermetically sealed chamber within a disk drive capable of holding gas at a pressure above that of ambient pressure and capable of being manufactured practically. It is an object of the present invention to provide a special connector mechanism and manufacturing process which eliminates flexcircuits between the junction of the hermetically sealed chamber.

Also, it is an object of the present invention to provide a method and means to increase drive platter rotation rate at lower energy levels. It is also an object of the present invention to reduce oxidation of the platters. It is yet another object of the present invention to provide a method and means for easy access to the components within the sealed chamber for repair by specially locating the connector devices which couple the components within the sealed chamber to a hardware controller. These objects, as well as others not specifically mentioned, will become clear by the discussions and descriptions which follow.

SUMMARY OF THE INVENTION

The preferred embodiment of the present invention includes an apparatus and method for producing the same. One aspect of the present invention is a method of producing a hard disk drive having disk drive mechanisms, the disk drive mechanisms including: a plurality of storage platters; a plurality of read/write heads, an actuator arm for positioning the plurality of read/write heads across surfaces of the plurality of platters; and a platter spindle, the method comprising the steps of: providing connector means comprising a spindle connector and a read/write connector; attaching the connector means to a PC board by using a solder fixture means to first align the connector means located on predetermined positions of the solder fixture means to predetermined positions on the PC board and then to solder the connector means onto the PC board at the predetermined positions on the PC board; providing header means comprising a spindle header and a read/write header; attaching the header means to a base by using an assembly fixture means to first align the header means to slot means located on the base and then to affix, by epoxy, the spindle header onto a first slot of the slot means and to affix, by screws, the read/write header onto a second slot of the slot means; coupling a cover onto the base to create a hermetically sealed chamber housing the disk drive mechanisms and to create a seal junction between the edges of the cover and the base; and coupling the spindle connector with spindle header and coupling the read/write connector with the read/write header so that there are no connector means located within the seal junction.

The present invention further includes a method of producing a hard disk drive as described above further comprising the step of injecting an inert gas into the hermetically sealed chamber. The present invention includes a method of producing a hard disk drive as described above wherein the inert gas is helium and is injected into the hermetically sealed chamber at ambient pressure to reduce tribological forces upon the drive mechanisms. The present invention includes a method of producing a hard disk drive as described above wherein the inert gas is nitrogen and is injected into the hermetically sealed chamber at ambient pressure to reduce oxidation of the drive mechanisms.

BRIEF DESCRIPTION OF THE DRAWINGS

FIG. 3(*b*) illustrates the read/write connector of the present invention attached to the PC board controller, to the assembly fixture, and the solder fixture.

FIG. 3(*c*) illustrates the spindle connector of the present invention which is attached to the PC board controller.

FIG. 5(*b*) is an illustration of the side view of the solder fixture tool of the present invention.

FIG. 6(*b*) shows the side view of the assembly fixture tool of the present invention.

DETAILED DESCRIPTION OF THE INVENTION

The present invention includes an apparatus and method for precise alignment of disk drive connectors and headers with a sealed disk chamber capable of containing nitrogen or helium gas for improved disk drive performance and reliability. The precise alignment of connectors and headers is accomplished by using two fixtures or tools to align special connectors to a PC board and to align receiving headers to slots of a base. When the PC board is coupled to the base the connectors align within the allowed tolerance of the present invention to the headers. The present invention also provides for easy repair of the disk drive because no epoxy, glue or other permanent connecting material is used to join the base of the present invention to the cover of the disk drive chamber. Instead, a screw assembly and cover gaskets are utilized. The present invention eliminates connecting flex-circuits from the cover and base seal junction. By filling the chamber with either helium or nitrogen, the present invention reduces oxidation and allows the platters to spin at high rates with low power consumption.

In the following detailed description of the present invention, numerous specific details are set forth in order to provide a thorough understanding of the present invention. However, it will be obvious to one skilled in the art that the present invention may be practiced without these specific details. In other instances well known methods and mechanisms have not been described in detail as not to unnecessarily obscure the preferred embodiment of present invention.

One aspect embodiment of the present invention relates to filling a hermetically sealed disk drive chamber with inert gas in order to reduce oxidation and to decrease tribological forces that act to slow down the spinning platters of disk drives. As discussed in the above section, conventional disk drives are sealed in order to keep out dust particles from the disk chamber. These prior art sealed chambers are not designed to be pressurized, they are designed to keep large dust particles out. The chambers of the present invention are used to seal in inert gas having very small atomic size, much smaller than the particles and dust sealed out in conventional disk drive chambers. The present invention must seal in atoms of nitrogen and helium within the drive chamber. The seal must also be able to withstand at least 5 psi of pressure above ambient pressure for reasons to be discussed below. Therefore, conventional sealing techniques are inadequate to operate to seal the present invention. For one reason, the seal of the present invention must be much stronger in order to prevent The helium and nitrogen atoms from escaping and secondly, the seal of the present invention must be able to withstand some pressure forces. Present disk drive design and implementation are not adequate to satisfy the requirements of the present invention.

Figure 2:
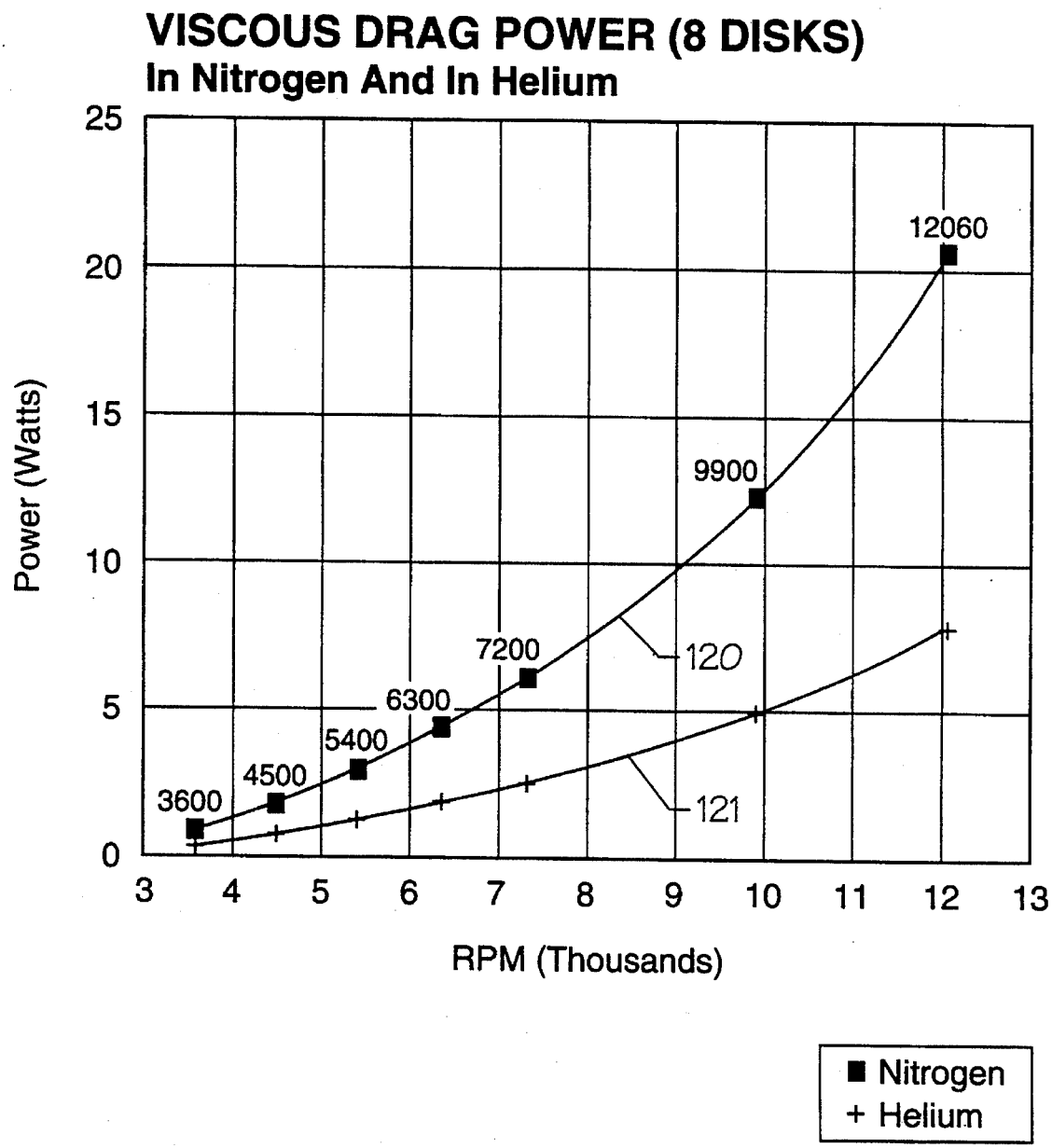
FIG. 2 shows two graphs of power versus revolutions per minute for a drive chamber filled with nitrogen in one sample and helium in the other sample.

FIG. 2 illustrates a graph of the power required (watts) in order to maintain the disk platters at specific rpm spin rates. Graph 120 represents the power required to maintain 8 platters spinning at given rpm spin rates when the disk chamber is filled with nitrogen gas. Since air is mostly nitrogen, graph 120 fairly typically represents conventional disk drive power requirements over the given rpm range because conventional disk drives are air filled. At 9900 rpm, the power required to maintain the platter spin rate is approximately 12.5 watts. The graph 121 represents a helium filled disk chamber. As can be seen, at 9900 rpm, only 5 watts of power are required to maintain this spin rate. This is so because the helium atoms within the sealed chamber of the present invention produce less tribological resistance forces against the spinning platters. Helium is a smaller atom than nitrogen and oxygen and therefore provides less resistance to the spinning platters.

The graph of FIG. 2 illustrates that at low spin rates, 3600 rpm, the power requirements of both chambers (nitrogen or helium) are fairly equal. However, as the demand for disk drive data access increases, the spin rate of the platters increase. Some computer system designs capable of processing data at a rate of 90 megabits per second require spin rates of approximately 10,000 rpm. At this high speed, it is appreciated that the power consumption difference between helium and nitrogen (air) is approximately 8 watts which is a significant power value. At 12,000 rpm the power difference between nitrogen (air) and helium approaches 14 watts. Therefore, the present invention advantageously utilizes a helium filled disk chamber to reduce power consumption of the disk drive.

Although a nitrogen filled disk chamber will not act to reduce power consumption over that of an air filled chamber, it will reduce oxidation of the drive platters. Therefore, the present invention includes two embodiments, one with a nitrogen gas filled chamber for preventing oxidation and one embodiment for a helium filled chamber to reducing power consumption of the disk drive unit. The structures discussed above will be further defined in the sections to follow. It should be appreciated that one aspect of the present invention includes an embodiment for filling a disk chamber with helium and an embodiment for filling a disk chamber with nitrogen for arriving at different results.

In order to provide the required hermetically sealed chamber, the present invention utilizes a novel and advantageous connector system to couple the disk drive mechanisms within the drive chamber to the controller board without coupling any ribbon connectors through the seal junction of the cover and the base. Because the connector system of the present invention is utilized to obtain the required hermetic seal to contain the helium and nitrogen gas, the connector system will be described first.

Connector System:

The preferred embodiment of the present invention utilizes a specially designed connector system with high placement tolerance in order to couple the disk drive components within the disk chamber to the controller PC board without requiring a flexcircuit to be located between the seal junction of the base assembly and the cover assembly, which creates the sealed chamber. This system is described herein.

Figure 1:
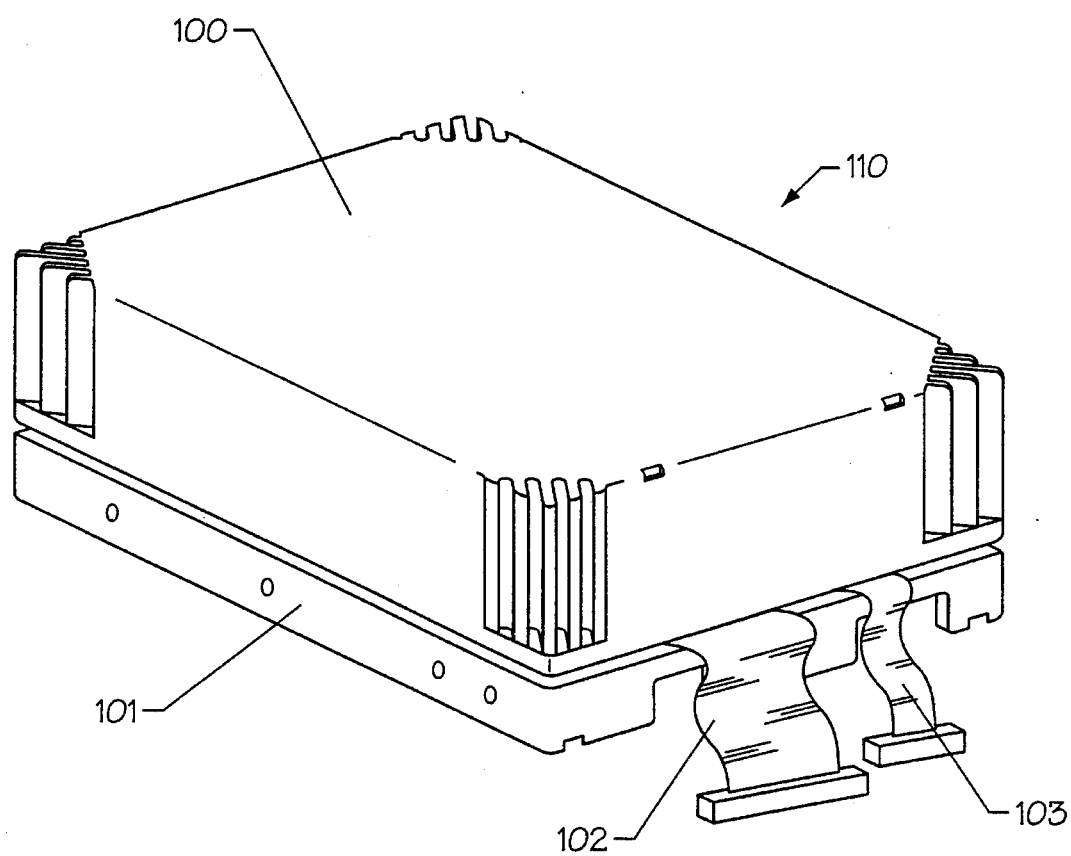
FIG. 1 is an illustration of a prior art design disk drive showing the location of the flexcircuits within the junction of the base and cover of the drive chamber.

The prior art system of coupling, as shown in FIG. 1, involved utilizing a flexible ribbon connector which coupled to the internal components of the drive and would hook back under the base to connect to the PC board controller circuit. These flexible flexcircuits where usually coupled to the PC controllers by hand and therefore the precise alignment of the PC board connectors to the base of prior art systems was not an issue due to the flexcircuit's flexibility and the manual installment techniques.

The present invention does not utilize a flexible flexcircuit system as in the prior art for the reasons discussed above. Instead, the base assembly of the present invention is adapted to directly connect, through special slots, the PC board connectors to the inner components of the disk chamber through headers located in these slots. Because of the connection scheme, alignment of the connectors on the PC board controller and their associated headers on the base assembly becomes crucial. Each connector and header must fit properly into the next with a tolerance of only ±2 mils. This is the case because the headers located within the slots of the base are specially coupled to the base to maintain the pressure tight seal within the disk chamber and these headers do not flex. To achieve this high tolerance interface between the PC board connectors and the base headers, the present invention utilizes two tools or fixtures for alignment and installation of the connectors.

Figure 8:
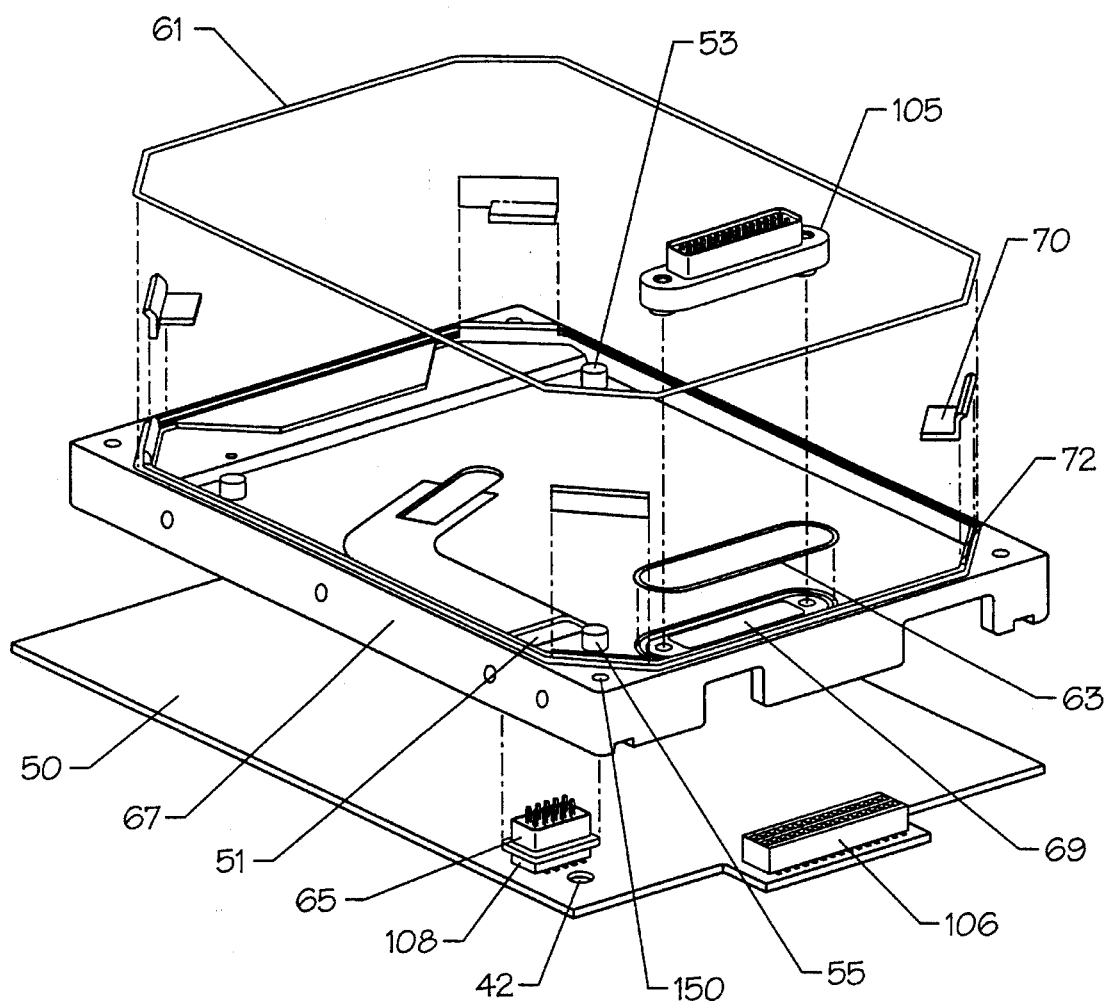
FIG. 8 illustrates the connection of the assembly fixture, base, gaskets, duplicate connectors and headers of the present invention.
Figure 9:
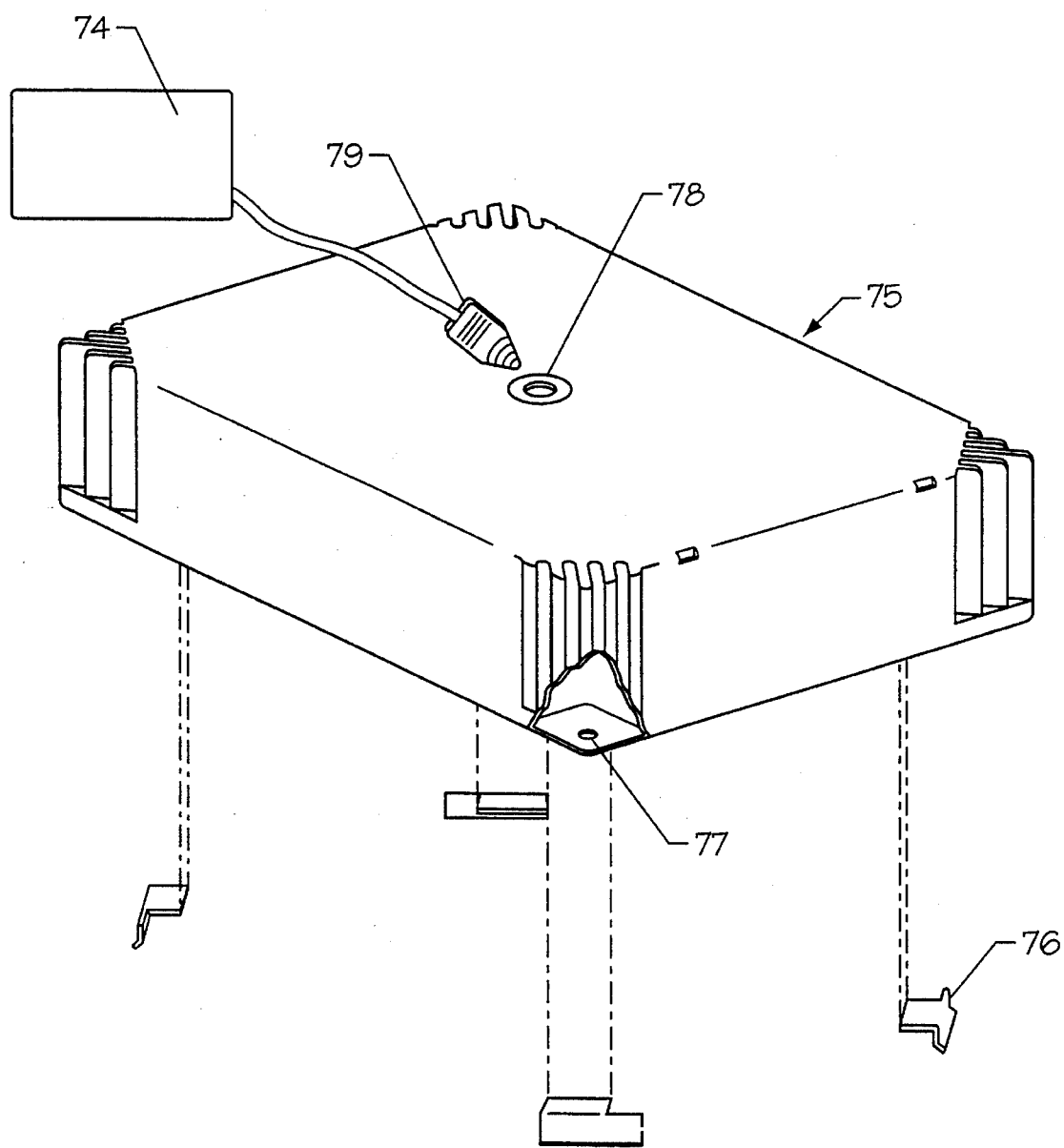
FIG. 9 is an illustration of the cover and gas inlet/outlet valve of the present invention.

The overall assembly of the present invention will be discussed first before details of the implementation of each manufacturing stage is illustrated. The present invention disk drive is composed of a base 67 shown in FIG. 8. This base provides support for the platters, spin motor and actuator arm holding the read/write heads of the disk drive unit. Components (disk drive mechanisms) that require sealing are placed into this base 67 and a disk cover 75 shown in FIG. 9 is positioned over the top of the base and disk drive mechanisms (not shown) to hermetically seal the mechanisms with the disk chamber, which is the sealed area surrounded by the cover 75 and the base 67. The based is fabricated to provide slots 69 and 51 for connector access outside of the disk chamber. A printed circuit board 80, shown in FIG. 4, containing the required hardware to control the devices within the disk chamber is coupled to the disk drive mechanisms through connector access slots 69 and 51. The board 80 is screwed into the bottom of base 67 with the component side facing out, or away from the base for easy access and repair. The actual disk drive mechanisms within the disk chamber of the present invention (such as the spinning platters, the actuator arm, the read/write heads and associated controlling mechanisms) are well known in the art of disk drive technology and are not described in detail herein as to not obscure understanding of the present invention. It is appreciated that using known techniques, the disk drive mechanisms of the present invention are attached to the base 67.

Figure 3A:
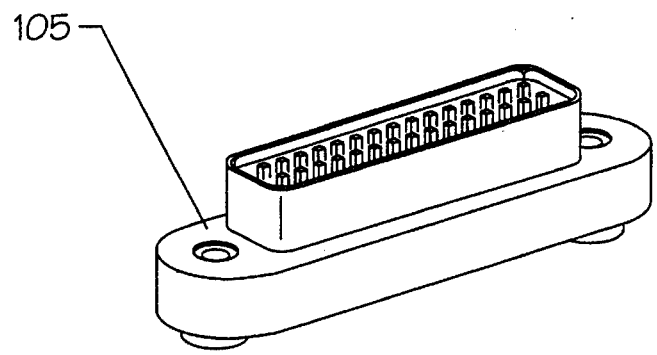
FIG. 3(*a*) illustrates the read/write header of the present invention.
Figure 3B:
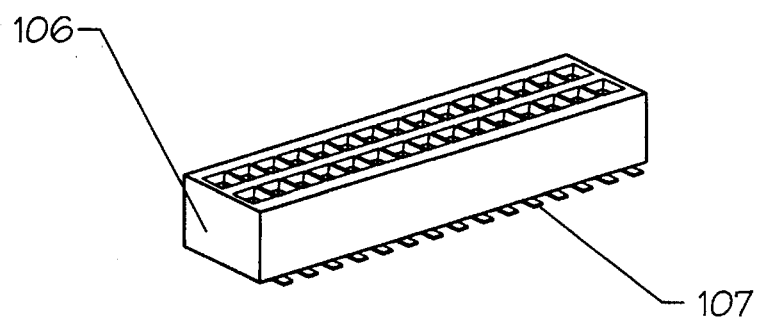
Figure 3C:
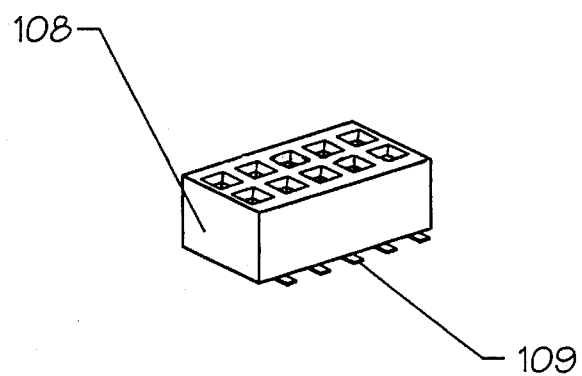

FIG. 3 illustrates three of the four connectors utilized in the present invention. FIG. 8 illustrates the fourth connector 65. The connector of FIG. 3(a) is the read/write header connector 105 having 30 square pins lined 15 per side and is approximately 1.5 inches in length. Header 105 has a male connector in an extended casing facing upward and an other male connector side in a recessed casing facing downward (not shown). In this fashion the header is capable receiving two female connectors, one for the top and one for the bottom. The header 105 also has a surrounding casing with two screw holes for receiving mounting screws. Header 105 is designed to couple with slot 69 on base 67. FIG. 3(b) illustrates a 30 slot female read/write connector 106 adapted for connection into the bottom of connector 105. Connector 106 is adapted for coupling to a PC board surface mount location by special contact pads 107 located on the bottom of the connector. There is a contact pad for each lead. The connector 106 is approximately 0.9 inches long. Female connector 108 of FIG. 3(c) is similar to connector 106 and is used to carry, among other data, power and information relating to the disk spin motor. Connector 108, the spindle connector, is approximately 0.4 inches long and has 10 slots 5 side by side. Connector 108 is also adapted for connection to a PC board surface mount location. The small contact pads (107 and 109) located on the bottom of connectors 106 and 108 are adapted to mount to isolated pre-soldered pads located on the PC board controller of the present invention.

Spindle header 65 of FIG. 8 is a 10 pin male connector, on both sides. This header is adapted to fit over connector 108 with the under side of header 65 inserted into the female end of connector 108. The other end of header 65 is adapted to fit into the coupling of to the spindle flexcircuit (not shown). Spindle header 65 is also adapted to fit into slot 51 of base 67.

The pin section of headers 65 and 105 are hermetically sealed by a thin coating of epoxy inserted around the mid-portions of the pin posts into the inner base section of the connectors under the male pins. This is done as a preventative measure to maintain the hermetically sealed chamber of the present invention since the headers fit within the surface of the disk chamber of the present invention.

Figure 4:
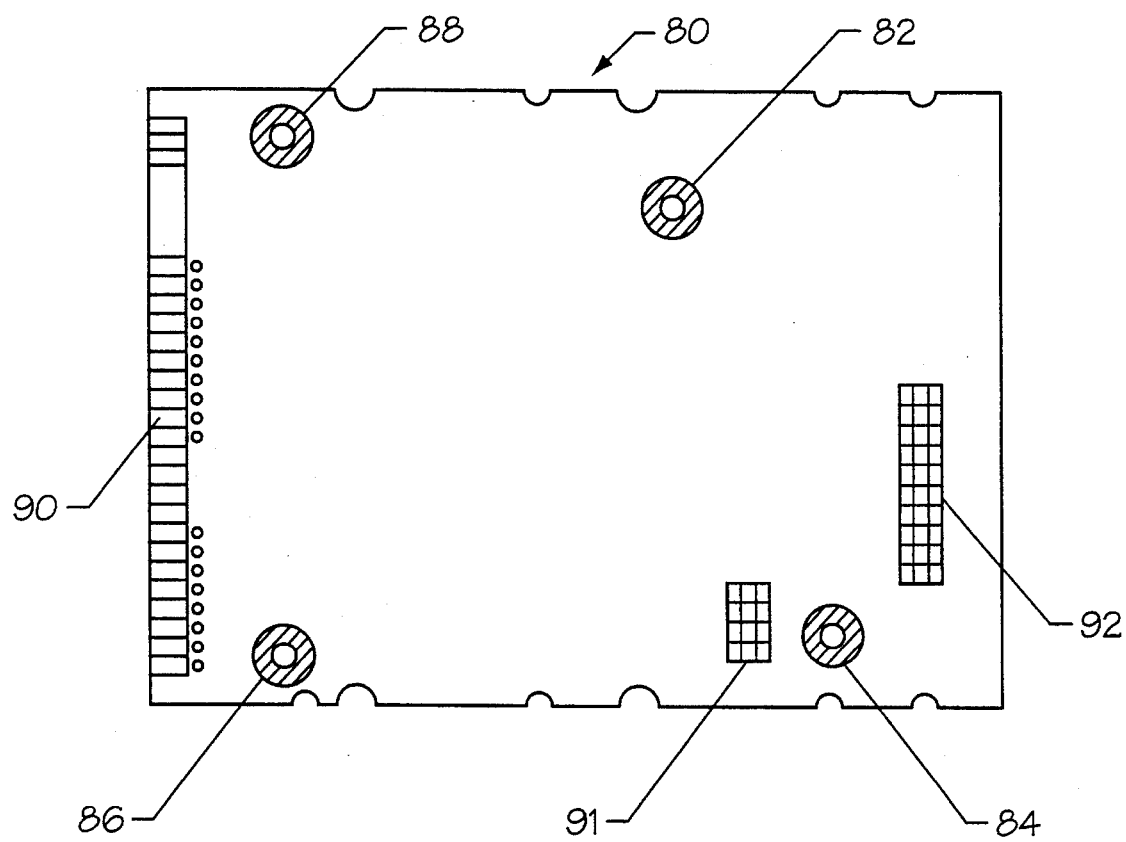
FIG. 4 illustrates a top view of the non-component side of the PC board controller of the present invention and the specific alignment holes.

FIG. 4 illustrates the non-component side of the printed circuit board 80 of the present invention. This circuit board 80 controls the disk drive mechanisms of the sealed chamber and must be coupled to them. Important features of the printed circuit board 80 include location 91 and location 92. Location 91 is adapted to receive spindle connector 108. Pad 91 has small solder pits or pads, one for each contact pad of the bottom of connector 108. When the contact pads of connector 108 are precisely aligned over these solder pits, pressed down and heated, the pits flow solder over the contact pads 109 of connector 108 to couple the read/write connector 108 to the circuitry of the PC board controller 80. The same is true for pad 92, it is adapted to receive the pads 107 of connector 106 in a similar fashion. Connector pad 92 is designed to carry the read/write information signals to the disk chamber mechanisms while pad 91 controls the signals to the spindle of the present invention.

FIG. 4 also illustrates special drilled holes 88 and 84. These are positioning or alignment holes which are precisely drilled and insulated from the circuitry of the controller in order to mate with a solder fixture (not shown) which will precisely align the connectors 108 and 106 into their respective pads 91 and 92. Each hole is adapted to receive an alignment post located on the solder fixture 15. On the edge of the PC board controller 80 is an edge connector 90. The edge connector 90 is designed to allow communication between the controller PC board 80 and the outside environment, which is typically a host computer system or other data management system. Information destined for storage into the disk drive or for communication outside of the disk drive will pass through the edge connector 90. The holes 88, 86, 82, 84 also provide for coupling to the base 67 in a separate and later step. The printed circuit board 80 of the present invention is mounted on the base 67 with the component side outward in order to provide easy access to the components on the board for repair, adjustment or improvement. The non-component side, shown in FIG. 4, is pressed to the bottom of the base 67 and thereby mates the two connector systems. The printed circuit board of the present invention is fabricated with surface mount technology and is approximately 5.6 inches long and 3.8 inches wide.

Figure 5A:
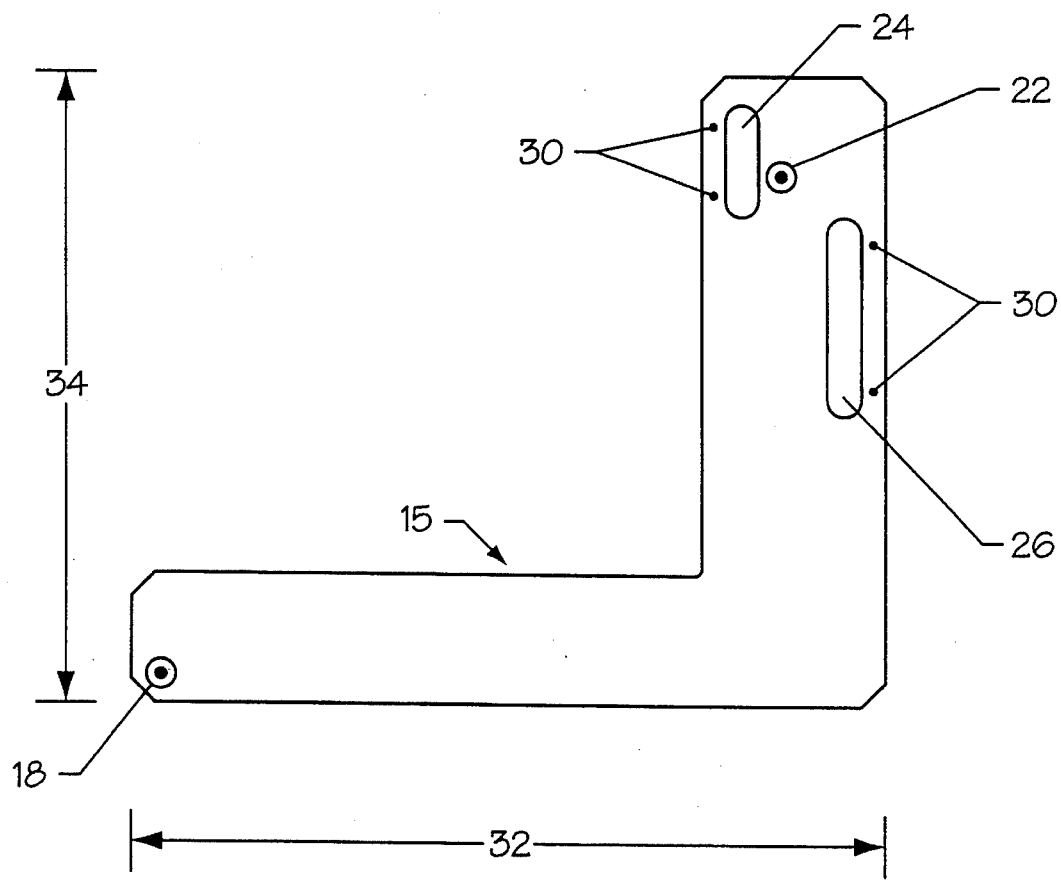
FIG. 5(*a*) is an illustration of the top view of the solder fixture tool of the present invention.

Referring to FIG. 5, the solder fixture 15 is shown. The solder fixture 15 is used to properly align and to install the connectors 108 and 106 to the PC board 80. The solder fixture 15 is not itself integrated into the final disk drive of the present invention. The top view of the solder fixture, FIG. 5(a), illustrates two alignment posts 18 and 22 located on the solder fixture. These posts are used to align the solder fixture 15 to two alignment holes of PC board 15, these holes are 88 and 84 respectively (shown in FIG. 4). The solder fixture is approximately 4.3 inches long across dimension 32 and approximately 3.6 inches wide across dimension 34.

The solder fixture 15 is approximately ⅛ inch thick. Standard pins 28 are adapted to secure the spindle connector 108 in place for attachment to pad 91 of PC board 80. The connector 108 is inserted such that the female holes of the connector match with the two pins 28 to properly align the spindle connector 108 with the solder fixture 15. The pads 109 of connector 108 are then facing out, away from fixture 15. The pins 28 are precisely designed to align connector 108 to pad 91 when the aligning posts 18 and 22 are inserted into the aligning holes 88 and 84, respectively, of the PC board. Similarly, alignment pins 30 are inserted into two of the female slots on read/write connector 106 to hold the connector in place. Pins 30 are precisely designed to align the read/write connector 106 over pad 92 of the PC board when the alignment posts of the solder fixture are inserted into the alignment holes of the PC board.

Figure 5B:
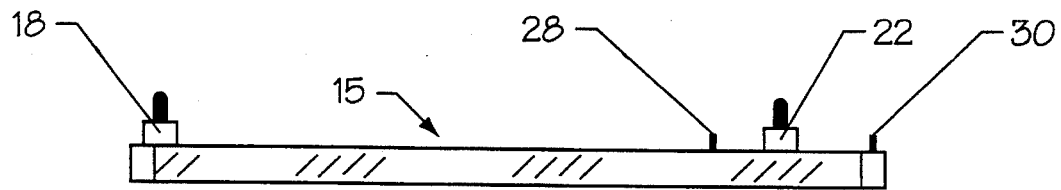

FIG. 5(b) illustrates a side view of the solder fixture tool 15. The identical alignment posts 18 and 22 are shown. They are adapted to fit within alignment holes of the PC board, and by the unique placement of the holes, they will fit into the PC board in only one way. Each alignment post is approximately 0.12 inches in diameter and approximately 0.04 inches long. The side view of standard pins 30 and 28 show that these pins are simulated connector pins adapted to temporarily mate with special slots of connectors 106 and 108.

Once the spindle connector 108 and the read/write connector 106 are aligned and attached to the solder fixture 15 by pins 28 and 30 respectively, the connectors are prepared for assembly to the PC board 80 of FIG. 4. Referring to FIG. 5(a), when the connectors are inserted in their respective pins, each connector's set of contact pads 107 and 109 are facing away from the base of the solder fixture 15. According to the present invention, the solder fixture 15 is then placed over the non-component side of the PC board 80 so that the facing side of the solder fixture 15 of FIG. 5(a) is facing the non-component side of PC board 80. In this fashion it can be seen that alignment post 18 is inserted into insulated hole 88, alignment post 22 is inserted into insulated hole 84. Note that holes 86 and 82 are not used in this alignment technique. Once both alignment posts are inserted into the proper insulated hole, the contact pads 109 of spindle connector 108 will be precisely aligned with pad area 91 and the contact pads 107 of the read/write connector 106 will be precisely aligned with pad 92. Placement, tolerances up to ±0.002 inch (2 mils) are accomplished by this alignment technique between connectors 108 and 106.

Once the contact pads of connectors 106 and 108 have been located onto solder regions 92 and 91 respectively, heat is gently added to the contact pads 107 and 109 in order to melt the solder pits located within regions 92 and 91. Each contact pad has a unique solder pit within regions 92 and 91 for mating. After the heat has been momentarily applied, the unit cools and connectors 106 and 108 are fastened to the non-component bearing side of PC board 80. After the connectors have been firmly attached, the solder fixture 15 is gently pulled away from the PC board 80 and the mounting pins 28 and 30 separate from the connectors. The solder fixture 15 is then free to mount another set of connectors onto another PC board 80. The female end of connectors 106 and 108 are then facing outward ready for coupling to the male connector headers. The contact pads 107 and 109 are soldered onto regions 92 and 91 respectively.

By utilizing the above technique for manufacturing, the spindle connector 108 and the read/write connector 106 are repeatedly placed within their respective solder areas 91 and 92 within ±0.002 inch tolerance. This precise tolerance is required for proper mating with the read/write header 105 and the spindle header 65 both located on base 67, as will be discussed further below. It is crucial that the connectors 106 and 108 be precisely aligned because once PC board 80 is affixed to base 67, there is little room for movement and these connectors must mate properly with the headers 105 and 65 which are located on base 67 and associated with specific base slots. Precise alignment of connector systems is required for proper mating of male and female contacts in order to not damage connectors of PCB.

Figure 6A:
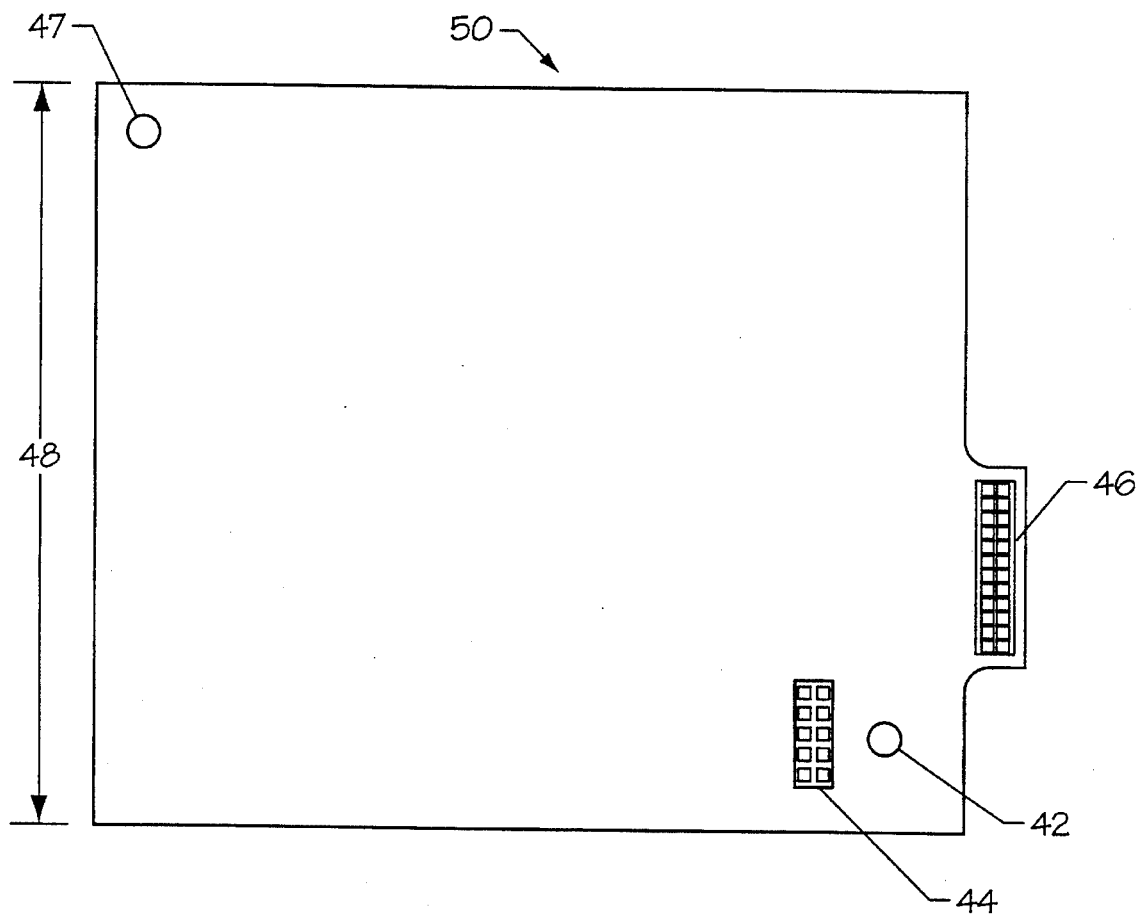
FIG. 6(*a*) shows the top view of the assembly fixture tool of the present invention.

The discussion relating to the header 65 and base 67 will now be presented. Refer to FIG. 6(a). A top view of the assembly fixture 50 of the present invention is illustrated in FIG. 6(a). Spindle header 65 and read/write header 105 are to be mounted onto base 67. The assembly fixture 50 is utilized by the present invention to properly align these headers to receive connectors 106 and 108 when PC board 80 is coupled to base 67. The assembly fixture is approximately 3.5 inches wide along dimension 48 and approximately 4.2 inches long along dimension 40. The portion of fixture 50 associated with region 46 extends from the fixture adequately to hold an exact duplicate of the read/write connector 106. An exact duplicate of the spindle connector 108 is placed into region 44 of the assembly fixture 40. Connector duplicates on region 44 and 46 are permanently attached to the assembly fixture 50. Two alignment holes 47 and 42 are drilled into the fixture 50. These alignment holes (approximately 0.12 inches in diameter) are positioned to match two alignment screw holes located on the bottom side of base 67 (shown in FIG. 7(a)). The alignment holes 47 and 42 of the assembly fixture 50 are also located to duplicate the alignment hole locations 88 and 84 of the PC board 80. In this manner, the assembly fixture 50 is a mock-up of PC board 80 with respect to the connectors 106 and 108 and the alignment holes.

Refer to FIG. 6(a). The connectors located at regions 46 and 44 of the assembly fixture 50 are installed using the solder fixture 15 as an alignment guide. A duplicate spindle connector 108' and a duplicate read/write connector 106' are both attached to the solder fixture 15 by their respective connecting pins 28 and 30. Treating assembly fixture 50 as a substitute PC board, the alignment posts 18 and 22 of the solder fixture 15 are then inserted into the alignment holes 47, 49, and 42 of the assembly fixture 50. There is only one way in which both alignment holes and pins will mate properly. Duplicate connector 106' is then aligned over region 46 and permanently cemented there. Duplicate connector 108' is aligned over region 44 and permanently cemented there. Once the connectors are secure, the solder fixture 15 is pulled away from the assembly fixture and the mounting pins 28 and 30 separate from the duplicate connectors. Therefore, the present invention constructs an assembly fixture 50 which is an alignment tool mock-up of the non-component side of the PC board 80.

Figure 6B:
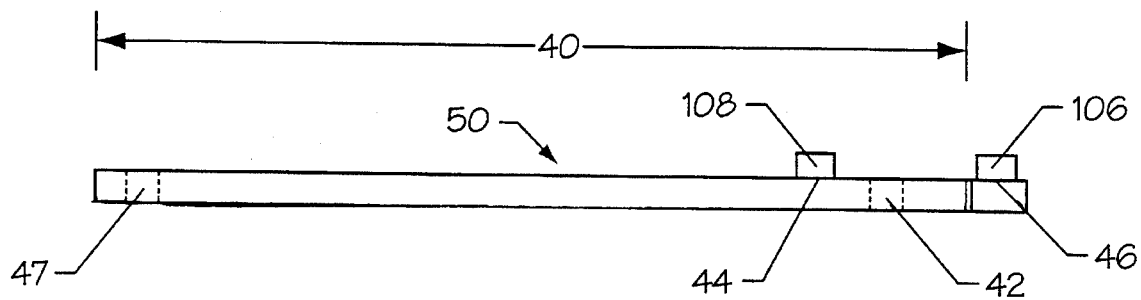

FIG. 6(b) illustrates the side view of the assembly fixture 50 of the present invention. Alignment holes 47 and 42 are shown as well as the permanently installed duplicate connectors 106 and 108 located in regions 46 and 44 respectively. The assembly fixture so has the thickness of a standard PC board. The assembly fixture 50 of the present invention is metallic, but it is appreciated that any equivalent material would provide a equal substitute.

Figure 7A:
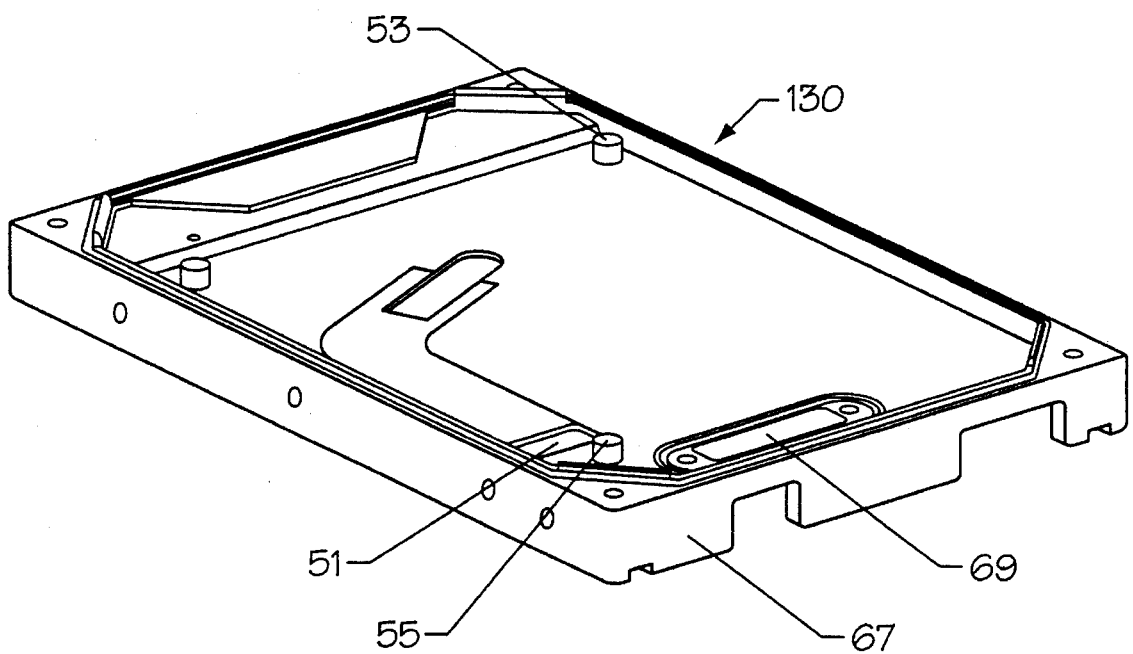
FIG. 7(*a*) and FIG. 7(*b*) illustrate the top and bottom view of the base of the present invention.
Figure 7B:
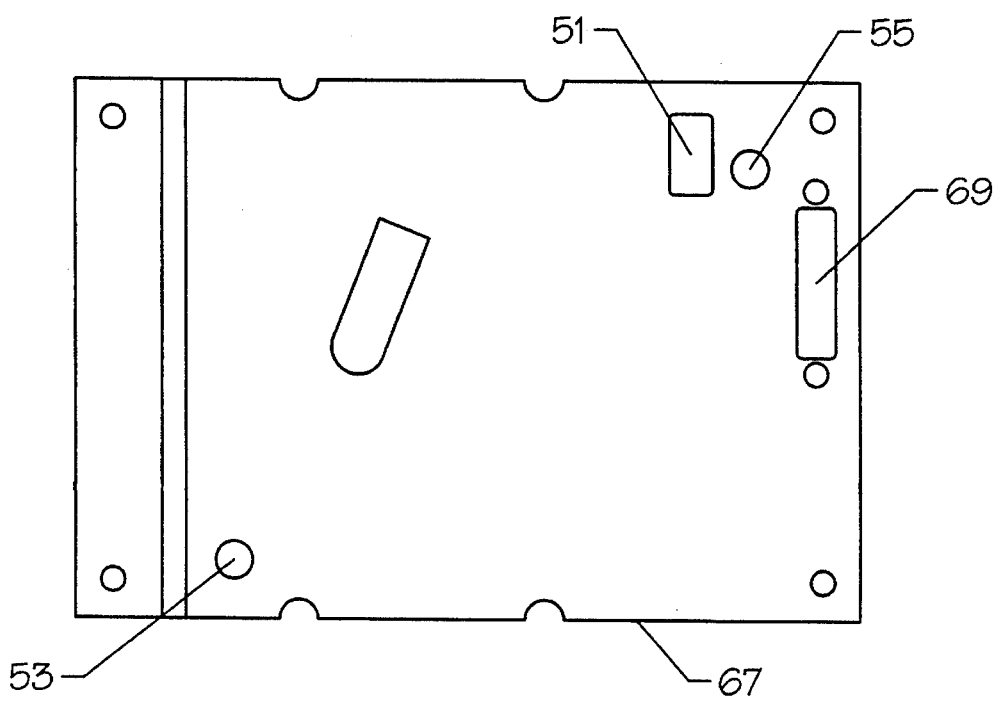

The process of the present invention relating to mounting the headers 65 and 105 to the base 67 using assembly fixture 50 will now be discussed. The assembly fixture 50 will be used as an alignment tool to precisely mount headers 65 and 105 to base 67 in such a way as to precisely align with connector 108 and 106 when the PC board 80 is coupled to the base 67. The base 67 holds the platters and the actuator arm (not shown). Refer to FIG. 7(a) and FIG. 7(b). FIG. 7(a) illustrates a top view of base 67 of the present invention. There are two header slots 51 and 69 fabricated into base 67. Slot 51 is fabricated to receive spindle header 65 while slot 69 is fabricated to receive read/write header 105. FIG. 7(b) illustrates the bottom view (as indicated by angle of view arrow 130) of base 67. When the assembly fixture 50 is properly aligned and attached to the bottom of base 67, duplicate spindle connector 108' will align under slot 51 while duplicate read/write header 106' aligns under slot 69. Alignment screw holes 53 and 55 are shown also in FIG. 7(b). These screw holes of base 67 will align with the holes of the assembly fixture 50 to align the fixture 50 to the base 67.

Before the assembly fixture 50 is aligned to the base 67, in order to affix spindle header 65 to base 67, spindle header 65 is first coupled to duplicate spindle connector 108 located on assembly fixture 50. As shown in FIG. 8, spindle header 65 has two male ends, an extended male end upward and a recessed male end below (obscured from view). The female slot region of duplicate spindle connector 108 is inserted into the recessed (bottom) male side of spindle header 65. At this time, header 65 is temporarily coupled to the assembly fixture 50. The top side of header 65 (around the flat edge extended portion 131 of FIG. 8) is then evenly coated with wet epoxy.

Next, referring back to FIG. 8, spindle header 65 is shown coupled to the duplicate spindle connector 108' on the assembly fixture 50. While the epoxy applied to the spindle header 65 is still wet, the assembly fixture 50 is connected to the bottom of base 67 so that alignment hole 42 matches with alignment screw well 55 on base 67 and lastly alignment hole 47 of the assembly fixture (not shown) matches with screw well 53 of the base 67. When the assembly fixture is aligned and flush with the back of base 67, spindle connector 65 is inserted into receiving slot 51 and the assembly fixture 50 is temporarily screwed into the base 67 by small screws which are inserted through each alignment hole of assembly fixture 50 and tightened into each associated screw well of the base 67. The screws act to align the spindle connector 65 with slot 51 and the spindle connector 65 becomes cemented to this slot by the epoxy. Once cemented, the junction between header 65 and slot 51 becomes air and pressure tight. Because header 65 is coupled to duplicate connector 108', header 65 is precisely aligned to receive connector 108 when the PC board 80 is eventually coupled to base 67.

Duplicate read/write connector 106' also becomes aligned under slot 69 of the base 67 when the screws are inserted to hold the assembly fixture 50 to the base 67. Next an O-ring header gasket 63 is inserted into a receiving grove that surrounds the slot 69. The header gasket of the present invention is a typical rubber gasket and is used to form an air tight seal around slot 69 once the read/write header 105 is inserted into slot 69. At this point, the read/write header 105 is attached from the top of slot 69, through the slot 69 to couple with the duplicate read/write connector 106' aligned beneath slot 69. The bottom side of header 105 is also a male connector which is recessed, so it fits into the extended female connector 106' (similar to the coupling of the spindle header 65 and the duplicate spindle connector 108'). The duplicate read/write connector 106' acts to align the read/write header 105 precisely into the slot 69 and header gasket 63. It should be noted that the header gasket ring surrounds the two mounting screws located on either side of the slot 69. Therefore, the screw and well locations associated with the header 105 do not have to be air tight since the gasket excludes them from the chamber. Two screws are then inserted into the read/write header 105 and inserted down into the screw holes on either side of slot 69. Read/write header 105 is then screwed into alignment and header gasket 63 seals the junction between the header 105 and the slot 69 so that it is air and pressure tight. It should be appreciated that the actual male connection pin regions of the read/write header 105 and the spindle header 65 have been made air tight by a thin epoxy layer deposited in the mid-section of header 105.

Once both headers 65 and 105 of the present invention are affixed to the base 67 as discussed above, the assembly fixture 50 is unscrewed and is pulled away from the base 67 by withdrawing connectors 108' and 106' from headers 65 and 105. Assembly fixture 50 is then free to install other headers to a new base of another disk drive unit. In this way, headers 105 and 65 are installed with great precision because a PC board mock-up (assembly fixture 50) was used in the installation process of the headers. Using the advantageous technique of the present invention, tolerances within ±0.002 (2 mills) can be achieved with respect to the headers 65 and 105 and associated connectors 108 and 106 on the PC board 80.

Once the headers 65 and 105 have been installed, the disk drive mechanisms (not shown), including the platters, the actuator arm, the platter motor and other control devices are inserted into the base 67. These typical disk drive mechanisms will be sealed within the drive chamber according to the discussions to follow.

Referring still to FIG. 8, a thin O-ring cover gasket 61, made of a rubber polymer, is inserted into a receiving grove 72 which surrounds the top edge of base 67. Vibration isolators 70, one on each corner of base 67 are also shown. Once the cover gasket 61 is in place within the grove 72 and the headers 65 and 105 are securely aligned and fastened to the base 67, the headers 65 and 105 must be coupled to the disk drive mechanisms (not shown) that have been placed into the base 67 and will reside within the sealed drive chamber when complete. The top extended male end of the spindle header 65, which is now protruding upward through slot 51 into base 67, is connected to a receiving connector which is directly coupled to the spindle mechanism (not shown) of the disk drive which has been placed onto base 67.

Since the spindle header 65 is installed into the base 67, the length of the connection required to couple header 65 to the spindle control is extremely small, thus reducing stray capacitance. Also, the top extended male portion of header 105 is coupled to a receiving read/write connector which is coupled to the input/output heads associated with the drive platters (these not shown). Since the read/write header is installed into the base 67, the length of the connection required to couple header 105 to the read/write heads associated with the platters is extremely small, thus also reducing stray capacitance. In this fashion, the typical drive components housed within the base 67 are coupled to the PC board 80 via headers 105 and 65. Data flow into and out of the disk drive unit is accomplished through the read/write header 105 and spindle control is accomplished through spindle header 65.

Referring to FIG. 9 and to FIG. 8, the cover 75 of the present invention is shown. This cover has an input orifice 78 which will be used to fill the disk chamber with nitrogen or helium. Internal screw well 77 is shown on the front corner of cover 75. Each corner of cover 75 has an identical screw well for receiving a screw from the base 67 to secure the base to the cover. Four vibration isolators reside on each corner of the cover 75 to help secure the cover 75 to the base 67. The cover 75 is positioned over the base 67 so that internal screw well 77 is aligned with hole 150 of the base and the other three holes on the corners of the base 67 align with three other internal screw wells of the cover 75. The cover is aligned so as to completely cover all of the drive mechanisms (not shown) when inserted on top of base 67. The bottom edge of the cover 75 presses flush with the O-ring cover gasket 61 within the grove 72 so that the junction between the cover 75 and base 67 is air and pressure tight and contains gasket 61 there between. Four securing screws are inserted, from the underside of the base 67 up into the base holes and into the receiving screw wells of the cover 75; the screws are then tightened.

It is appreciated that the cover gasket runs a loop that excludes the screw holes, see screw well 77 (FIG. 9) and the bases holes, see hole 150 (FIG. 8). The hole-well combination lies outside the sealing gasket. Using this technique, the screws are eliminated from the air tight seal allowing the seal to be more reliable. For screws that are required to exist within the sealing gasket, one embodiment of the present invention utilizes special self-sealing fastener screws that have a tiny gasket ("O-ring") pre-installed around the screw head which seals the screw/hole junction upon insertion. These types of screws are available from Sealskrews and one advantageously used with the present invention is of type SFR phillips-recessed (part number: 6-32NC-2A).

Using four screws, the cover 75 is secured to the base 67 and a hermetically sealed chamber is formed in between which houses all of the drive mechanisms. O-ring gasket 61 seals the major junction between the cover and the base. The O-ring Gasket 63 seals junction between the screwed in header 105 and the slot 69. Epoxy cement seals the permanently installed spindle header 56 to slot 51. The result is a hermetically sealed chamber with two header connectors located and accessible through the bottom of base 67. No flexcircuits are protruding through the junction between the base 67 and the cover 75 plates. Also, no cement or epoxy is used to seal the junction between the base 67 and the cover 75, so that the cover 75 is easily removable.

It is appreciated that all of the above steps that precede the sealing of the disk drive chamber take place in a clean room environment to reduce the amount of particles and dust that are allowed to come into contact with the drive mechanisms located within the drive chamber. Clean rooms and clean room technology are well known processes.

PC Board Controller 80 Installation:

The next step of the present invention is to couple the PC board 80 to the bottom of the base 67. The non-component side of the PC board is coupled to the bottom side of the base. The PC board controller 80 is an important component of the disk drive unit and it is assembled onto the bottom of the base 67. It is appreciated that when most disk drives are actually used, the disk drive is installed within the host so that the component side of PC board is facing upward for access. However, it is convenient within this discussion to refer to the side of the base 67 which receives the PC board 80 as the "bottom" side.

FIG. 4 illustrates the non-component side of the PC board controller 80. According to the preferred embodiment of the present invention, the spindle connector 108 and the read/write connector 106 have previously been aligned and installed on the PC board within regions 91 and 92 respectively by the solder fixture 15. The facing side of the PC board 80 is placed against the bottom side of base 67 so that screw hole 84 aligns with alignment screw well 55 of base 67 (as illustrated in FIG. 7(b)). Also, screw hole 86 aligns with screw well 52, screw hole 82 with well 54, and screw hole 88 with well 53. When these holes and wells are aligned, spindle connector 108 is perfectly aligned with spindle header 65 which is cemented into slot 51 and read/write connector 106 is precisely aligned with read/write header 105 which is screwed into slot 69.

The PC board 80 is then gently pushed so that the connectors 106 and 108 gently side within headers 105 and 65 respectively. Then screws are placed into each aligned screw hole and well pair and the PC board 80 is securely screwed onto base 67. It is appreciated that when the connectors and headers are coupled the controller circuits of the PC board 80 are now directly coupled to the drive mechanisms within the sealed chamber, and no external flex ribbon is required. Also, according to the advantageous method and apparatus of the present invention, the step of coupling the drive mechanisms to the PC board controller is accomplished during the same step which attaches the PC board 80 to the base 67, thus eliminating one manufacturing step required for the disk drive manufacture. The present invention also utilizes special slots 51 and 69 for coupling thus eliminating any flex connecting means from the seal junction.

It is appreciated that the 0.002 inch tolerance for the placement of the headers on the base and connectors on the PC board is required in view of the last step. If the headers or connectors were misaligned in any small way, the PC board 80 would not fit properly into the base receptors. In a manufacturing environment, this would cause unit destruction and/or failures. Therefore, the solder fixture 15 and the assembly fixture 50 are utilized to align the placement of these connectors. Each fixture is also calibrated against the other, since the assembly fixture 50 is created using the dimensions of the solder fixture 15. In such a way 0.002 inch alignment tolerance is maintained during manufacturing.

Surface Coating:

The base 67 and the cover 75 are metallic. The chamber that is created between these plates must hold helium or nitrogen gas and must be able to withstand 5 psi pressure differential. The chamber must also securely hold the gas inserted. The porosity of the metallic plates is such that they will allow small atoms of helium to escape from the chamber walls over time. The same is true for nitrogen, but at a slower rate. To solve this problem, the present invention advantageously utilizes a special electrostatic coating process and material called "E-coat." E-coating is a commercially available coating material. This coating is applied to the surfaces of the base 67 and cover 75 and all other surfaces making up the hermetically sealed chamber. The E-coating is applied before the plates are assembled together. Every surface, inner and outer, of each plate is completely coated. Since the coating is a finished black coating, it is also utilized as a finishing coating for the final product giving the product an advantageous look. With the E-coating applied, the overall sealed chamber porosity is lowered 97 percent to an acceptable amount to contain the helium and nitrogen gas.

Helium/Nitrogen Injection:

Once the disk drive unit of the present invention is assembled as discussed above and the hermetically sealed chamber is established, the drive unit is ready to inject the required gas. Refer to FIG. 9. In a clean room, utilizing an inlet/outlet hole 78, a input nozzle 79 is inserted into this hole and a seal is created between the nozzle and the inlet/outlet hole 78. Using well known techniques for filling a chamber with gas, an injection system 74 delivers nitrogen gas (99 percent pure) into the chamber. The input nozzle 79 also allows for back flow of contents of the chamber that are forced out of the chamber by the incoming gas. The gas is filtered into the chamber until substantially all of the prior gaseous contents (air) of the chamber have been evacuated. A gas sensor is located within the tip of the input nozzle 79 and when the nozzle indicates that the chamber is 99 percent filled with nitrogen gas, the gas delivery system 74 is suspended and the input hole 78 is sealed shut. Because of the back flow allowed within the input nozzle, when the delivery system is suspended, the pressure of the nitrogen gas within the sealed chamber is at ambient pressure, there is no pressure differential between the nitrogen gas within the sealed chamber and the air outside the chamber.

The present invention advantageously utilizes nitrogen gas to evacuate any oxygen stored within the sealed chamber during manufacturing. In this way oxidation forces upon the drive platter are reduced since nitrogen is an inert gas and will not react to the magnetic platters or drive mechanisms of the disk drive. Also, since nitrogen gas has similar characteristics as air, the drive mechanisms that are calibrated for an air mixture within the chamber will operate properly within a pure nitrogen environment without modifications. Therefore, one aspect of the present invention is to provide a hermetically sealed disk drive chamber without connector ribbons between the cover and base junction wherein the sealed drive chamber is filled with nitrogen to reduce oxidation of the mechanisms within the disk drive chamber.

Helium gas is inserted into the sealed drive chamber in the same way as nitrogen gas is injected. The helium gas is inserted through the input nozzle 79 the nozzle sensor indicates that the chamber is filled with 99% helium at which time the delivery system 74 is suspended and input hole 78 is sealed shut. The helium pressure within the chamber is maintained to that of ambient pressure so there is no pressure differential within the sealed chamber.

One embodiment of the present invention advantageously fills the sealed disk chamber with helium gas in order to provide an environment around the spinning platters that contains less tribological forces and resistance because of the small atom size of helium. At high spin rates of 9900 rpm, as discussed above (FIG. 2), air filled disk drives consume more than twice the power of helium filled disk drives. This is the case, partly because helium atoms are so small and less dense as compared to nitrogen and oxygen atoms of air. At high spin rates, the atom size and density becomes relevant because of the air resistance created by the surfaces of the platters and the gas as the platters spin within the chamber. More energy is required to be supplied to the platter spin motor to overcome this resistance to maintain the desired spin rate. This energy is released in the form of heat into the surrounding environment, including the PC board 80 attached to the present invention. The maximum spin rate of most disk drives with an air filled chamber is 6300 rpm, because at this rate 5 to 6 watts of power are dissipated causing the temperature to increase 36 degrees Celsius. At a sustained temperature above this value, many of the pre-amps of the disk drive unit will fail. Therefore excessive heat dissipation is a crucial element to eliminate in high spin rate disk drive designs.

With a helium filled chamber, the present invention can sustain spin rates of 10,000 to 11,000 rpm while dissipating only 5 to 6 watts of power. At these spin rates, drives with air filled chambers dissipate twice the energy and exceed the threshold temperature at which many conventional circuits fail. At 10,000 rpm the present invention (utilizing a helium filled chamber) can advantageously process disk data at 90 megabits per second while dissipating heat within the acceptable range. This is a vast improvement over conventional design.

It should be noted, that the characteristics of helium in the sealed chamber change the lifting properties of the flying read/write heads. In well known formulas which characterize the movement of the flying heads, specially designed and shaped heads are constructed to adapt to the helium environment. The present invention advantageously utilizes these formulas to provide a read/write head that conforms to the properties of the helium gas.

For best results, a vacuum could be utilized to remove all of the gaseous contents of the chamber. However for a variety of manufacturing and reliability reasons a vacuum is not practical to implement nor maintain. Since the read/write heads are designed to fly on a cushion of gas within the chamber, a vacuum environment would not support conventional disk drive read/write head design. Therefore, an inexpensive, small atomic weight, inert gas is preferred and helium is the gas of choice. It should be appreciated that the helium gas inserted within the sealed chamber also produces protection against oxidation of the platters in the same way nitrogen reduces oxidation, as discussed above.

Chamber Pressure Specification:

Although the sealed chamber of the present invention is created at ambient pressure(14.7 psi), it is designed to withstand a 5 psi differential in pressure between the gas in the chamber and outside. This is done because at high altitudes of approximately 10,000 feet above sea level the atmospheric pressure can be reduced by 5 psi. Also, during shipping of the disk drive units, most airplane cargo bays are pressurized only to a pressure found at 10,000 feet above sea level. The chambers of the present invention are designed to be able to withstand this differential so the helium or nitrogen gas will not escape during unit transit or high elevation use. Prior art designs are not effected by this pressure change because they are sealed to keep particles and dust out of the chamber whereas the present invention seals the chamber to keep helium or nitrogen within the chamber. By utilizing the sealing gaskets, E-coating of the chamber surfaces and by eliminating the flexcircuits from within the sealing junction, the present invention will maintain at least a 5 psi differential in pressure and securely hold the injected gas.

Prior art systems locating connecting ribbon in the chamber junction would not support the requirement that the chamber be maintained at a 5 psi differential. The sealing techniques of the prior art are ineffective to hold gas at ambient pressure with a 5 psi differential outside the chamber. The junctions of the prior art design are not strong enough to stop the helium and nitrogen gas from escaping, because of the irregular shape of the ribbon located in the sealing junction.

Therefore, the present invention advantageously describes a method and apparatus for maintaining a hermetically sealed chamber filled with either nitrogen or helium and able to withstand a 5 psi differential in pressure outside of the sealed chamber to contain the helium or nitrogen gas.

Reduction of Stray Capacitance:

The present invention also offers a design that reduces the amount of unwanted stray capacitance associated with disk drives that can become significant with respect to high spin rate disk drives. This stray capacitance is created by the flexcircuits connectors that are located through the chamber junction and couple the drive mechanisms within the disk chamber to the controller board of prior art design disk drives. The longer the flexcircuits, the worse the stray capacitance level. The present invention advantageously reduces this unwanted stray capacitance by eliminating the flexcircuit of the prior art design. As discussed above, the header connectors 65 and 105 are directly coupled to the PC board 80 and also to the spindle and read/write head assembly. This reduces the size of connection required to couple to PC board controller 80 to the drive mechanisms within the drive chamber. By reducing stray capacitance, the disk drive of the present invention operates more reliably at higher spin rates and data access rates than prior art systems.

Access Within the Sealed Chamber of the Present Invention:

The hermetically sealed chamber of the present invention is secured with gaskets and screws as discussed above. Prior art systems glue the base and cover together thus creating a permanent seal there between. In order to access the components of the drive within the sealed chamber, prior art designed disk drives must be "cut" open at great expense and damage to the internal components. Damage to the internal components of a prior art disk drive typically means repair is not possible and a total failure results.

The present invention provides ready access to the mechanisms within the chamber. If repair or improvement is required to an assembled unit, the drive chamber can be easily re-opened because the base 67 and the cover 75 of the present invention are not permanently sealed together. First the PC board 80 is removed from the base 67 bottom by removing the screws and pulling the connectors 108 and 106 of the PC board 80 out of the headers 65 and 105. Next, the four chamber sealing screws are taken out and the cover 75 simply lifts off the base 67 leaving the internal drive mechanisms exposed for repair or improvement. After that process, the disk drive unit of the present invention is easily reassembled and the helium or nitrogen gas refilled through input orifice 78 and the delivery system 74 of the present invention. Each step can be economically accomplished. Therefore, the present invention discloses an advantageous method and apparatus for easily and inexpensively repairing or improving assembled drive units.

The preferred embodiment of the present invention, a disk drive having a hermetically sealed chamber capable of being filled with either helium or nitrogen and having specialized connector systems coupling the internal drive mechanisms with a PC board controller without locating flexible flexcircuit within the sealed chamber junction is thus described. While the present invention has been described in one particular embodiment, it should be appreciated that the present invention should not be construed as limited by such embodiment, but rather construed according to the below claims.

What is claimed is:

1. A method of producing a hard disk drive having disk drive mechanisms, said disk drive mechanisms including: a plurality of storage platters; an actuator arm for positioning a plurality of read/write heads across surfaces of said plurality of platters; and a platter spindle, said method comprising the steps of:

attaching connector means onto a PC board by using a solder fixture means to align said connector means located at predetermined positions of said solder fixture means with predetermined positions on said PC board and then affixing said connector means to said PC board at said predetermined positions on said PC board;

attaching header means onto a base by using an assembly fixture means to align said header means relative to predetermined slots in a base and then affixing said header means within said predetermined slots in said base while so aligned;

coupling a cover onto said base to create a hermetically sealed chamber and a seal junction between edges of said cover and said base for housing said disk drive mechanisms; and coupling said connector means of said PC board with said header means of said base so that there are no connecting means located within said seal junction of said hermetically sealed chamber.

2. A method of producing a hard disk drive as described in claim 1 where the affixing of connector means to said PC board is by soldering said connector means to said predetermined positions on said PC board.

3. A method of producing a hard drive as described in claim 1 wherein:

said header means comprises a read/write header and a spindle header; and said read/write header is affixed within said first slot of said predetermined slots by screws and said spindle header is affixed within said second slot of said predetermined slots by epoxy.

4. A method of producing a hard drive as described in claim 3 further comprising the step of inserting a header gasket into said first slot before said read/write header is affixed to said first slot to hermetically seal said first slot and said read/write header.

5. A method of producing a hard drive as described in claim 1 wherein said step of coupling said cover onto said base comprises the steps of:

inserting said disk drive mechanisms into predetermined positions of said base;

coupling said header means to said disk drive mechanisms;

inserting an O-ring cover gasket into a receiving groove located in said seal junction; and aligning said cover to said base and securing said cover to said base with removable securing means.

6. A method of producing a hard drive as described in claim 5 further comprising the step of coating surfaces of said base and said cover with E-coating to reduce porosity of said surfaces.

7. A method of producing a hard drive as described in claim 5 wherein said removable securing means comprises screw means and wherein said receiving groove is located on said edge of said base.

8. A method of producing a hard drive as described in claim 1 wherein said step of coupling said connector means of said PC board with said header means of said base comprises the steps of:

aligning said PC board to said base by aligning pairs of alignment holes located within said PC board and within said base;

inserting said connector means into said header means;

securing said PC board to said base with screw means thorough said pairs of alignment holes located within said PC board and said base.

9. A method of producing a hard drive as described in claim 8 wherein said connector means and said header means are spatially aligned to within ±0.002 inches when said PC board is aligned with said base.

10. A method of producing a hard drive as described in claim 1 wherein said connector means located on predetermined positions of said solder fixture means is aligned with said predetermined positions on said PC board using post means located on said solder fixture means which are adapted to fit into alignment holes located on said PC board.

11. A method of producing a hard drive as described in claim 10 wherein said step of attaching said connector means onto said PC board further comprises the step of removing said solder fixture means from said connector means once said connector means is affixed to said PC board.

12. A method of producing a hard drive as described in claim 1 wherein said assembly fixture means comprises duplicate connector means located on predetermined positions on said assembly fixture means which align said header means into said predetermined slots on said base; and wherein said header means is aligned with said predetermined slots of said base by aligning pairs of alignment holes located on said assembly fixture and said base and inserting screw means into said pairs of alignment holes.

13. A method of producing a hard drive as described in claim 12 wherein said step of attaching said header means onto said base further comprises the step of removing said assembly fixture from said base after said header means are affixed to said predetermined slots of said base.

14. A method of producing a hard drive as described in claim 1 further comprising the step of injecting an inert gas into said hermetically sealed chamber.

15. A method of producing a hard drive as described in claim 14 wherein said inert gas is helium and is injected into said hermetically sealed chamber to reduce tribological forces upon said disk drive mechanisms.

16. A method of producing a hard drive as described in claim 14 wherein said inert gas is nitrogen and is injected into said hermetically sealed chamber to reduce oxidation upon said disk drive mechanisms.

17. A method of producing a hard drive as described in claim 15 wherein said inert gas is injected into said hermetically sealed chamber at ambient pressure.

18. A method of producing a hard drive as described in claim 1 wherein said hermetically sealed chamber can withstand a 5 psi differential in pressure with respect to the pressure outside said hermetically sealed chamber.

19. A method of producing a hard drive as described in claim 1 wherein said predetermined positions on said assembly fixture means which align said header means into said predetermined slots on said base are positioned on said assembly fixture means by said predetermined positions on said solder fixture means.

20. A method of producing a hard disk drive having disk drive mechanisms, said disk drive mechanisms including: a plurality of storage planers; a plurality of read/write heads, an actuator arm for positioning said plurality of read/write heads across surfaces of said plurality of platters; and a platter spindle, said method comprising the steps of:

providing connector means comprising a spindle connector and a read/write connector;

attaching said connector means to a PC board by using a solder fixture means to align said connector means located at predetermined positions of said solder fixture means with predetermined positions on said PC board and then soldering said connector means onto said PC board at said predetermined positions on said PC board;

providing header means comprising a spindle header and a read/write header;

attaching said header means to a base by using an assembly fixture means to align said header means relative to slot means located in said base and, while so aligned, then affixing by epoxy, said spindle header within a first slot of said slot means and then affixing, by screws, said read/write header within a second slot of said slot means;

coupling a cover on to said base creating a hermetically sealed chamber for housing said disk drive mechanisms and also creating a seal junction between the edges of said cover and said base; and coupling said spindle connector with said spindle header and coupling said read/write connector with said read/write header so that there are no connector means, which couple said drive mechanisms and said PC board, located within said seal junction of said hermetically sealed chamber.

21. A method of producing a hard disk drive as described in claim 20 further comprising the step of injecting an inert gas into said hermetically sealed chamber.

22. A method of producing a hard disk drive as described in claim 21 wherein said inert gas is helium and is injected into said hermetically sealed chamber at ambient pressure to reduce tribological forces upon said drive mechanisms.

23. A method of producing a hard disk drive as described in claim 21 wherein said inert gas is nitrogen and is injected into said hermetically sealed chamber at ambient pressure to reduce oxidation of said drive mechanisms.

24. A method of producing a hard disk drive as described in claim 21 further including a header gasket coupled between said read/write header and said second slot of said slot means, said header gasket for maintaining said hermetically sealed chamber.

25. A method of producing a hard disk drive as described in claim 21 further including a cover gasket coupled between said base and said cover, said cover gasket for maintaining said hermetically sealed chamber.

26. A method of producing a hard disk drive as described in claim 20 wherein said solder fixture means comprises alignment pins and said PC board comprises alignment holes and wherein said connector means of said solder fixture means is aligned to said predetermined positions on said PC board by aligning said alignment pins on said solder fixture means to said alignment holes on said PC board.

27. A method of producing a hard disk drive as described in claim 20 further comprising the step of aligning and coupling said PC board to said base and wherein said step of coupling said spindle connector with said spindle header and coupling said read/write connector with said read/write header occurs during said step of coupling said PC board to said base.

28. A method of producing a hard disk drive as described in claim 27 wherein said connector means and said header means are aligned to within ±0.002 inches when said PC board is aligned to said base.

29. A method of producing a hard disk as described in claim 20 wherein said step of coupling said cover on to said base is accomplished with removable screw means and not accomplished with a permanent sealing means.

* * * * *